United States Patent
Bannister et al.

(10) Patent No.: US 9,278,289 B2
(45) Date of Patent: Mar. 8, 2016

(54) VALIDATION OF USER ENTITLEMENT TO GAME PLAY

(71) Applicant: MICROSOFT TECHNOLOGY LICENSING, LLC, Redmond, WA (US)

(72) Inventors: Vincent Bannister, Redmond, WA (US); Bryan Born, Snohomish, WA (US); Brahmnes TF Fung, Redmond, WA (US); Joe Downing, Redmond, WA (US); Avi Ben-Menahem, Sammamish, WA (US); Devin Jenson, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 481 days.

(21) Appl. No.: 13/853,868

(22) Filed: Mar. 29, 2013

(65) Prior Publication Data

US 2014/0295955 A1  Oct. 2, 2014

(51) Int. Cl.
*A63F 13/00* (2014.01)
*A63F 13/69* (2014.01)
*A63F 13/73* (2014.01)

(52) U.S. Cl.
CPC .............. *A63F 13/69* (2014.09); *A63F 13/73* (2014.09)

(58) Field of Classification Search
CPC .............................. G06F 21/50; G07F 17/3232
See application file for complete search history.

(56) References Cited

U.S. PATENT DOCUMENTS

| 5,023,907 | A | 6/1991 | Johnson et al. |
| 7,861,306 | B2 | 12/2010 | DeMello et al. |
| 8,167,707 | B2 | 5/2012 | Kelly et al. |
| 2010/0095125 | A1 | 4/2010 | Srinivasan et al. |
| 2010/0223656 | A1 | 9/2010 | Ray et al. |
| 2010/0250389 | A1 | 9/2010 | Augustin et al. |

OTHER PUBLICATIONS

"Guidance on using the App Specific Hardware ID (ASHWID) to implement per-device app logic (Windows)", Retrieved at <<http://msdn.microsoft.com/en-us/library/windows/apps/jj553431.aspx>>, Nov. 15, 2012, pp. 7.

*Primary Examiner* — Reginald Renwick
(74) *Attorney, Agent, or Firm* — Bryan Webster; Judy Yee; Micky Minhas

(57) ABSTRACT

Various embodiments relating to validating a user's entitlement to play a game are provided. In one embodiment, a request for a user to play a game is received at a validation service. The request may include an obfuscate-encoded bundle including a signed user ID identifying the user, a signed hardware ID of a computing machine on which the game is requested to be played, and a signed receipt. The obfuscate-encoded bundle may be decoded and the request may be validated according to a plurality of security checks including determining that one or both of the signed hardware ID or the signed user ID respectively match a hardware ID and/or a user ID included in the signed receipt. If the request to play the game is valid, an authentication token may be sent to the computing machine that allows the user to play the game on the computing machine.

20 Claims, 5 Drawing Sheets

VALIDATION OF USER ENTITLEMENT TO GAME PLAY

BACKGROUND

Unauthorized distribution, modification, or usage of games may result in unreliable game play that negatively affects game developer revenue, among other hindrances. Some level of protection may be afforded to reduce a possibility of unauthorized distribution and tampering of games beyond a purchase or license agreement, while not overly inconveniencing a rightful owner because of such protection.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Various embodiments relating to validating a user's entitlement to play a game are provided. In one embodiment, a request for a user to play a game is received at a validation service. The request to play the game may include an obfuscate-encoded bundle including a signed user ID identifying the user, a signed hardware ID of a computing machine on which the game is requested to be played, and a signed receipt. The obfuscate-encoded bundle may be decoded at the validation service, and it may be determined whether the request is valid according to a plurality of security checks including determining that one or both of the signed hardware ID and/or the signed user ID respectively match a hardware ID or a user ID included in the signed receipt. If the request to play the game is valid, an authentication token may be sent to the computing machine that allows the user to play the game on the computing machine.

DETAILED DESCRIPTION

The present disclosure relates to mechanisms for validating a user's entitlement to play a game without being overly intrusive of the user's game play experience. More particularly, the present disclosure relates to mechanisms for bundling information related to the user's identity, an identity of an associated computing machine, and a receipt for the game and sending the bundled information to a service to provide a robust validation of the user's entitlement to play the game. By validating the user's entitlement to play the game, a possibility of the game being played without authorization on a plurality of computing machines by other users that are not entitled to play the game may be reduced. Moreover, tampering or other unauthorized modification of the game that may result in cheating or other malicious activity may be reduced. The validation described herein may be used with virtually any computing system and is not limited to a single managed platform, such as a particular console game system.

Figure 1:
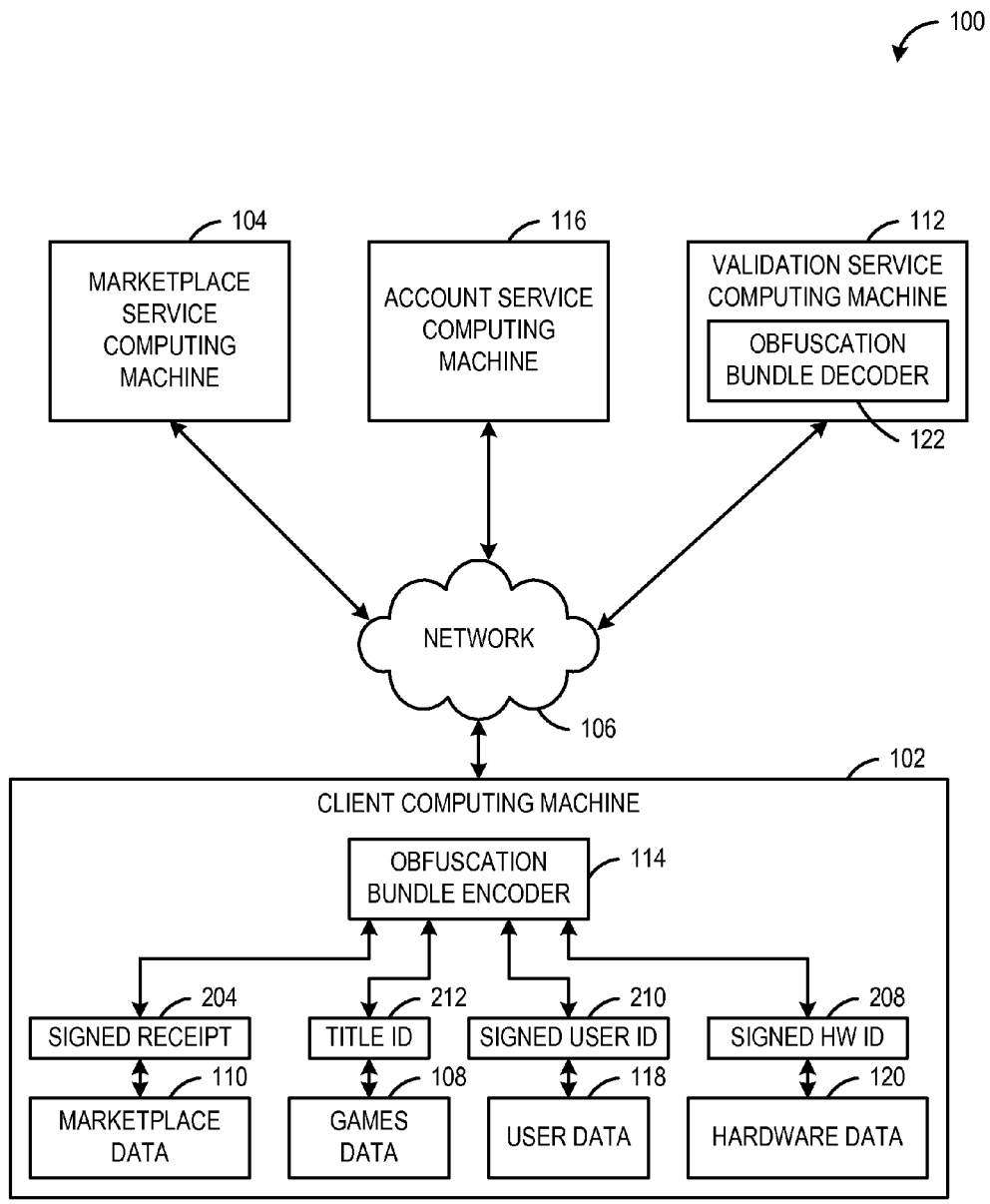
FIG. 1 schematically shows a computing system in accordance with an embodiment of the present disclosure.

FIG. 1 shows a computing system 100 in accordance with an embodiment of the present disclosure. The computing system 100 may be configured to allow a client computing machine 102 (referred to herein as "client") to acquire a game, for example via purchase, from a marketplace service computing machine 104 (referred to herein as "marketplace") over a network 106, such as the Internet. The marketplace may include a library of games available for acquisition by various clients of the computing system.

Figure 2:
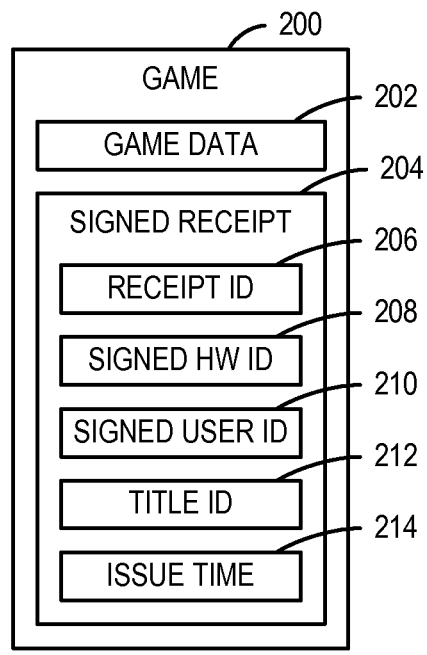
FIG. 2 schematically shows a game issued with a signed receipt in accordance with an embodiment of the present disclosure.

For example, when the client purchases a game from the marketplace, the marketplace may issue the game 200 as shown in FIG. 2 to the client. The game may include game data 202 and a signed receipt 204. The game data may include the actual bits to install and execute the game on the client. The signed receipt may have a digital signature that is signed by the marketplace. In one particular example, the signed receipt may include an XML blob that is signed using an XML digital signature private key that is held by the marketplace.

The signed receipt 204 may include a receipt identity (ID) 206, a signed hardware ID 208, a signed user ID 210, a title ID 212, and an issue time 214. The receipt ID may be an individualized identity for a given user/game combination. This means the same user for the same game would be issued the same receipt ID on the same computing machine or any other computing machine. On the other hand, the same user for a different game or a different user for the given game would be issued a different receipt ID.

The signed hardware ID 208 may include a component name and an ID for each of a plurality of components of the client computing machine from which the game is purchased. Non-limiting examples of such components include a processor, a motherboard, memory, storage devices, network card address/media access control (MAC) address, etc. The collection of components may provide an individualized identity of the computing machine that can be differentiated from other computing machines. The signed hardware ID may have a digital signature that is signed by the operating system of the client computing machine.

In some embodiments, a plurality of client computing machines may be associated with a user ID, and each of the plurality of computing machines may have a different individualized hardware ID. For example, a user may have a desktop computer, a laptop computer, a tablet computer, and a smartphone—each having a different individualized hardware ID.

The signed user ID 210 may identify the user in the computing system. The signed user ID may have a digital signature that is signed by an account service computing machine that manages users of a computing platform. For example, the user ID may be used to track user data generated from playing games, consuming content, interacting with other users, and the like.

The title ID 212 may be a direct representation of the title of the game as presented by the marketplace or another suitable title specific identifier. The title ID need not be a robust private key secured title identity. Rather, the title ID may be a representation of the game identity as available from APIs.

The issue time 214 may be a time stamp of when the receipt is issued for purchase of the game by the user. In some cases, the issue time may also represent a time stamp of when the signed receipt was most recently issued (e.g., to replace a lost receipt, retrieve a receipt at a new computing machine of the user, etc.) after purchase of the game by the user.

In some embodiments, one or more of the various items included in the signed receipt may be omitted. For example, in some embodiments, the user ID may be omitted from the signed receipt.

Continuing with FIG. 1, when the game is downloaded to the client, the game data 202 and the signed receipt 204 may be stored at the client. In particular, the game data 202 may be stored within games data 108 that may represent a collection of data relating to different games acquired by the user from the marketplace. Further, the signed receipt 204 may be stored within marketplace data 110 that may represent a collection of acquisition information or records of games acquired from the marketplace by the user.

Figure 3:
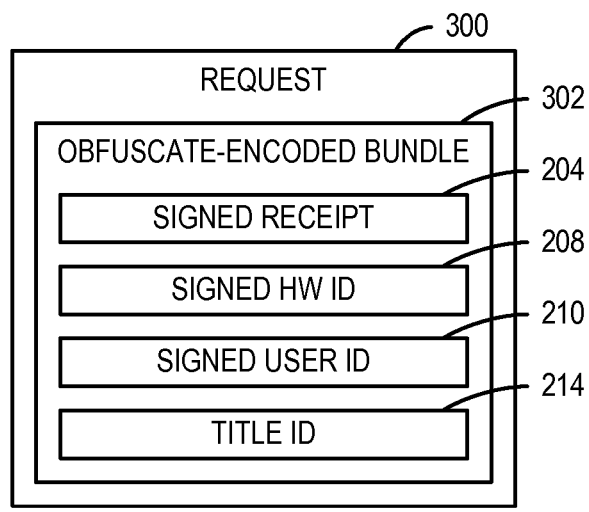
FIG. 3 schematically shows a request including an obfuscate-encoded bundle of validation information in accordance with an embodiment of the present disclosure.

When the game 200 is launched by the user at the client, a validation process may be performed to attest that the user is entitled to play the game. The validation process may be performed at a validation service computing machine 112 (referred to herein as "validation service"). In particular, the validation service may receive a request 300 as shown in FIG. 3 from the user to play the game. The request 300 may include an obfuscate-encoded bundle 302 including the signed receipt 204, the signed hardware ID 208, the signed user ID 210, and the title ID 212. The obfuscate-encoded bundle may be provided by an obfuscation bundle encoder 114 that may be configured to gather the information from various locations and encode the information to conceal its purpose in order to reduce a possibility of tampering or other malicious activity. The obfuscate-encoded bundle may be concealed or protected in any suitable manner.

The validation process may begin with a user sign-in process that may be initiated to sign the user into a computing platform in order to identify the user. In particular, the client may send credentials to an account service computing machine 116 (referred to herein as "account service") that verifies the credentials of the user and returns a service ticket to the client with the signed user ID. The service ticket may be stored at the client within user data 118. The user data may track or represent user activities, statistics, behaviors, or the like from playing various games or interacting on the client. The signed user ID may identify the user to other services and may allow for subsequent interactions on the client and with other services. If the user is already signed in, then the sign-in process may be silent. If the user is not signed in, then the user may be prompted to sign in or an automatic sign in procedure may be initiated. If the user does not sign in or is not automatically signed in, then user data tracking, virtual awardables (e.g., achievements), and other functionality may be suppressed.

Once the user is signed into the account service, the obfuscation bundle encoder may be configured to call an API to retrieve the signed user ID from the service ticket stored in the user data. Further, the obfuscation bundle encoder may be configured to call an API to populate the title ID from the game data. Further still, the obfuscation bundle encoder may be configured to call an API to generate the signed hardware ID from the hardware data 120. In one example, the signed hardware ID is generated by hashing aspects of the operating system of the client for the component names and IDs, and arranging the component names and IDs in an anonymized string.

The obfuscation bundle encoder may be configured to call an API to retrieve the signed receipt from the marketplace data on the client, or from the marketplace if a signed receipt is not stored at the client. In one example, the API takes the combination of the signed user ID from the service ticket, the title ID saved in the game data, and the signed hardware ID representing the client, and performs a look up based on the information at the marketplace to see if the user has purchased the title and returns a corresponding signed receipt as proof of purchase.

The obfuscation bundle encoder may be configured to bundle the signed receipt, the signed hardware ID, the signed user ID, and the title ID in a request that is obfuscated to reduce a possibility of the bundle being stolen and/or tampered with by unauthorized entities. The request including the obfuscate-encoded bundle may be sent to the validation service for validation of the user's entitlement to play the game.

In some embodiments, the client may execute a sandbox environment type operating system without direct hardware access and without administrator level access. As such, the above described scenario is discussed in terms of using APIs to retrieve data from different locations, although it is to be understood that any suitable mechanism for gathering and encoding the data may be employed. Moreover, it is to be understood that the above described mechanisms may be employed in an open operating system having direct hardware access and administrator level access.

The validation service may be configured to receive the request and decode the obfuscate-encoded bundle via an obfuscation bundle decoder 122 to reveal the signed receipt, the signed hardware ID, the signed user ID, and the title ID. In some embodiments, each time a request is received at the validation service, the information in the bundle may be recorded for tracking purposes and analysis purposes. In particular, the hardware ID from the signed receipt, the signed hardware ID, the signed user ID, and the receipt ID from the signed receipt may be recorded.

The validation service may be configured to determine whether the request is valid by performing a plurality of security checks. The plurality of security checks may include determining that the digital signatures of the signed user ID, the signed hardware ID, and/or the signed receipt are valid. For example, the digital signature of the signed user ID, the signed hardware ID, and/or the signed receipt may be signed with corresponding private keys held by respective originating service(s) that can be verified by corresponding public key(s) held by the validation service, as part of an asymmetric security scheme. It will be appreciated that any suitable security scheme may be employed to authenticate the user ID, the hardware ID, and/or the receipt.

In some embodiments a digital signature of the signed hardware ID, a digital signature of the signed user ID, and a digital signature of the signed receipt are signed by services included in a same computing platform. In other words, the account service, the marketplace service, the service that generates the hardware ID, and the validation service may be included in the same computing platform. Alternatively, in some embodiments, one or more of the services may be part of a third-party computing platform.

The plurality of security checks may include determining that the issue time of the signed receipt is within a validity interval. In one example, the validity interval may be set from a release date of the game to the current date. In another example, the validity interval may be set from a date in which the user activated their account to the current date. In yet another example, the validity interval may be set from a purchase date of the game to the current date. It will be appreciated that the validity interval may be set to any suitable date range or time period.

The plurality of security checks may include determining that the signed hardware ID, the signed user ID, and/or the title ID of the game included in the signed receipt matches the signed hardware ID, the signed user ID, and/or the title ID included in the obfuscate-encoded bundle.

The validation service may be configured to compare the signed hardware ID in the request with signed hardware IDs of previous requests by the user in order to determine a number of computing machines on which the user has played the game. The plurality of security checks may include various fraud rules. In particular, the validation service may receive valid, matching entitlement claims to a video game, and the validation service may check the fraud rules to make sure that there is no other reason to prevent access to the game. In one example, the plurality of security checks, and more particularly the fraud rules, may include a check for simultaneous accesses or game executions to prevent fraud. For example, the plurality of security checks may include determining that the number of computing machines on which the user has played the game is less than a computing machine threshold. The computing machine threshold may be used to determine whether a user is authorized to play the game on their computing machines as entitled through purchase of the game. Moreover, the computing machine threshold may reduce a possibility of the game being distributed without authorization to computing machines of other players who are not entitled to play the game.

In one example, the computing machine threshold may be set to a number of computing machines that may be suitable for a typical user to own over a lifetime of the game (e.g., 5 computing machines). In another example, the computing machine threshold may be set to a number of computing machines that may be suitable for a typical family to own over a lifetime of the game (e.g., 20 computing machines for a family of four). In the family example, such relationship information may be retrieved from the account service by the client and included in the obfuscate-encoded bundle. In yet another example, the computing machine threshold may be set for a designated time period. In one example, if a user did not play a game on a computing machine within the last year, then that computing machine may be dropped from the total number of computing machines that is compared to the computing machine threshold. For example, the computing machine threshold may be set to three computing machines on which a game may be played in a given year. It will be appreciated that the computing machine threshold may be set to any suitable number of computing machines. Moreover, the designated time period may be set to any suitable time period.

If the plurality of security checks is valid, then the validation service may determine that the request is valid. If the request is valid, then the validation service may send an authentication token to the client that allows the user to play the game on the client. Further, the authentication token may be used by downstream services to perform further access control. If the plurality of service checks is invalid, then the validation service may prevent the client from playing the game. For example, the validation service may not issue the authentication token to the client.

Although the above described scenario is discussed in terms of sending a request responsive to launching a video game (or other digital content item, application, etc.) it is to be understood that a request may be sent to the validation service for any suitable reason. In one example, a request may be sent to the validation service in order to perform a qualifying game action. For example, a qualifying game action may include at least one of launching a game, continuing play of a game, granting to the user an achievement for the game, updating a leader board of the game, or storing a game statistic of the user. It will be appreciated that any suitable game action may trigger the request to be sent to the validation service.

In one example, every game action may qualify as a qualifying game action that triggers a request to be sent to the validation service. In another example, every $N^{th}$ game action may qualify as a qualifying game action, where N is a given threshold number of game actions. In yet another example, a qualifying game action may occur every M time period (e.g., 1 hour). It will be appreciated that a game action may qualify according to any suitable frequency.

Although the above described scenario is discussed in terms of purchasing a game, it is to be understood that the marketplace may provide any suitable form of digital media content, such as music, videos, e-books, applications, etc. Moreover, the computing system may include any suitable number of different marketplaces that may provide various types of content that can be purchased or otherwise acquired by different clients for authorized consumption. In some cases, a marketplace may be included in a same computing platform as the client. In some cases, a marketplace may be included in a third-party computing platform. Furthermore, such content items may be purchased, leased, rented, or provided gratis without departing from the scope of this disclosure.

Figure 4:
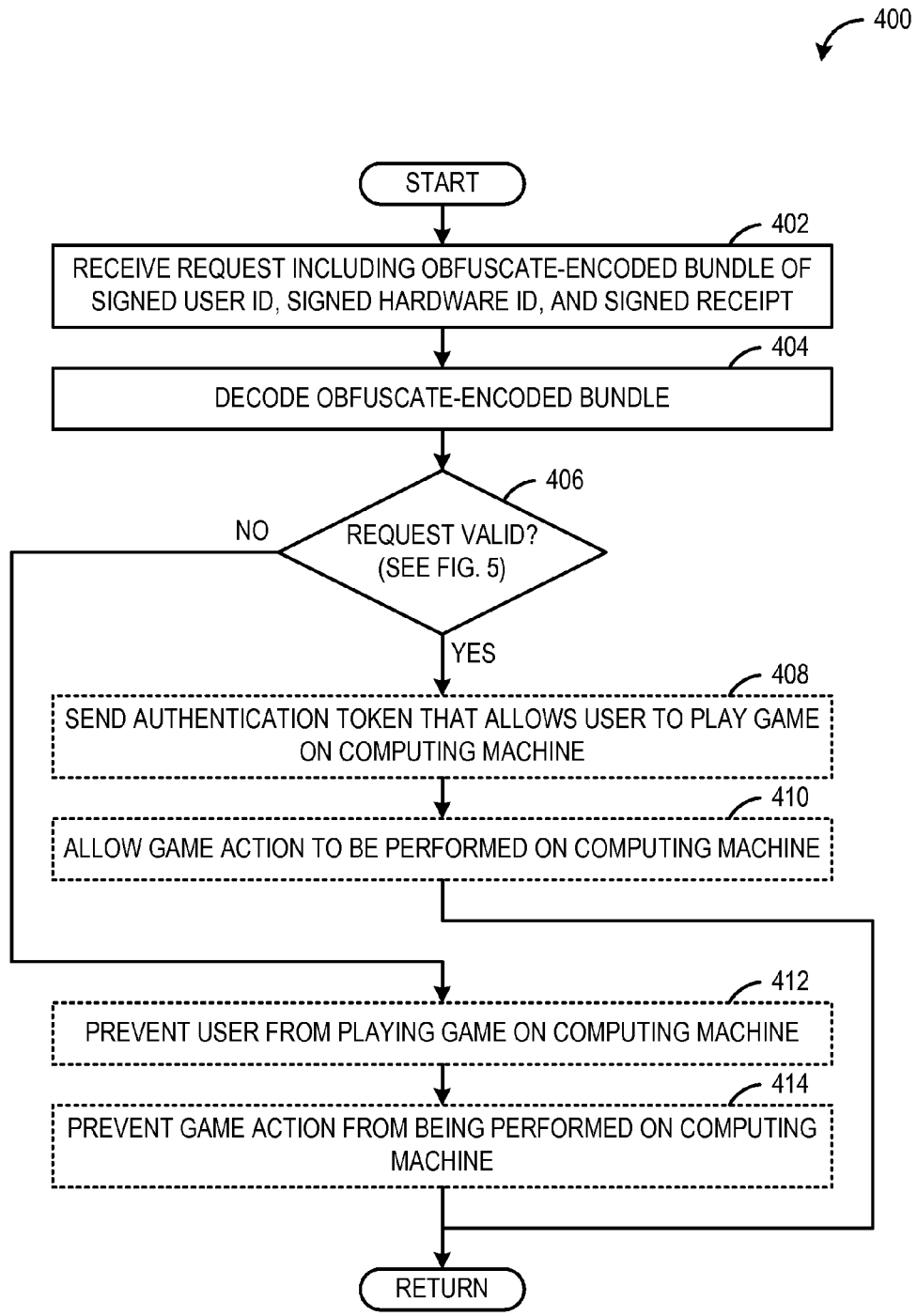
FIG. 4 shows a method for validating a user's entitlement to play a game in accordance with an embodiment of the present disclosure.

FIG. 4 shows a method 400 for validating a user's entitlement to play a game in accordance with an embodiment of the present disclosure. For example, the method 400 may be performed by the validation service 112 of FIG. 1.

At 402, the method 400 may include at the validation service, receiving a request including an obfuscate-encoded bundle including a signed user ID identifying a user, a signed hardware ID of a computing machine on which the request originated, a title ID of the game, and a signed receipt. The bundled information may be obfuscate-encoded to conceal its purpose or its logic, in order to prevent tampering, cheating, or any other malicious activity. The signed receipt may provide a proof of purchase of a game by the user from a marketplace.

In some embodiments, the signed receipt may include an issue time, a receipt ID, a title ID of the game, and/or a hardware ID of the computing machine from which the game was purchased. The receipt ID may be an individualized identity for a given purchaser and title ID combination. The receipt ID may be used for the same purchaser and the same game on any suitable computing device. The same purchaser for a different game or a different purchaser for a given game will get a different receipt ID.

The request may be received at the validation service according to different actions. In some cases, the request may be made in order to play the game, such as when the user launches the game on the client. In some cases, the request may be made in order to perform a qualifying game action (e.g., continuing to play the game after a threshold period, granting an achievement, updating a leader board, or storing a game statistic, etc.).

At 404, the method 400 may include decoding the obfuscate-encoded bundle to reveal the bundled information. In one example, the obfuscate-encoded bundle may be decoded by the obfuscation bundle decoder 122, although it is to be understood that the obfuscate-encoded bundle may be decoded in any suitable manner.

At 406, the method 400 may include determining whether the request is valid based on a plurality of security checks. The plurality of security checks are described in further detail below with reference to FIG. 5. If the request is valid, the method 400 moves to 408. Otherwise, the method 400 moves to 412.

In the case where the request is made in order to play the game, at 408, the method 400 may include sending an authentication token to the computing machine that allows the user to play the game on the computing machine (e.g., unlocks the game). For example, the authentication token may be stored on the client and may represent the user's entitlement to play the game while the authentication token is valid. In some embodiments, the authentication token may be ephemeral such that the token may need to be reissued by the validation service after a given duration.

In the case where the request is made in order to perform a qualifying game action, at 410, the method 400 may include allowing the qualifying game action to be performed on the computing machine. In one example, the validation service may send a credential or other indication that game data or a virtual awardable (e.g., an achievement) may be stored on the computing machine.

In the case where the request is made in order to play the game, at 412, the method 400 may include preventing the user from playing the game on the computing machine. In one example, preventing the user from playing the game on the computing machine includes not sending the authentication token to the computing machine.

In the case where the request is made in order to perform a qualifying game action, at 414, the method 400 may include preventing the qualifying game action from being performed on the computing machine.

By validating the request using the signed user ID, the signed hardware ID, and the signed receipt at the validation server, a possibility of unauthorized use of the game may be reduced, while not overly interfering with an authorized user's game play experience.

Figure 5:
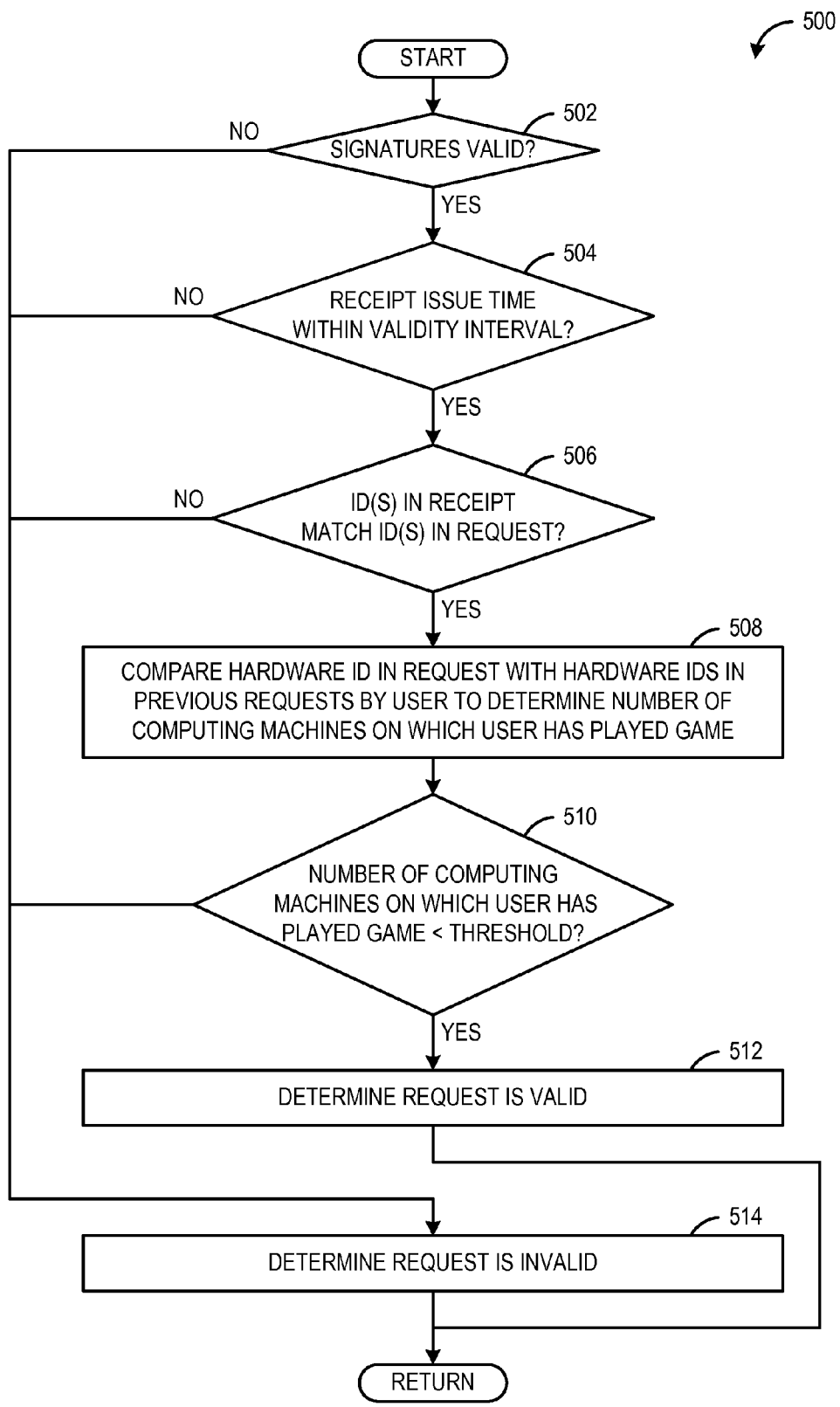
FIG. 5 shows a method of determining whether a request is valid according to a plurality of security checks in accordance with an embodiment of the present disclosure.

FIG. 5 shows a method 500 of determining whether a request is valid according to a plurality of security checks in accordance with an embodiment of the present disclosure. For example, the method 500 may be performed by the validation service 112 of FIG. 1.

At 502, the method 500 may include determining whether the digital signatures of the signed user ID, the signed hardware ID and the signed receipt are valid. In one example, the signed user ID may be signed by the account service 116, the signed hardware ID may be signed by the operating system of the client 102 (or an associated service that generates the hardware ID), and the signed receipt may be signed by the marketplace 104. If the digital signatures of the signed user ID, the signed hardware ID, and the signed receipt are valid, then the method 500 moves to 504. Otherwise, the method 500 moves to 514.

At 504, the method 500 may include determining whether a receipt issue time of the signed receipt is within a validity interval. If the issue time of the signed receipt is within the validity interval, then the method 500 moves to 506. Otherwise, the method 500 moves to 514.

At 506, the method 500 may include determining whether a hardware ID, a user ID and/or a title ID of the game included in the signed receipt matches a hardware ID, a user ID, and/or a title ID of the game included in the obfuscate-encoded bundle of the request. If the ID(s) included in the signed receipt match the ID(s) included in the obfuscate-encoded bundle of the request, then the method 500 moves to 508. Otherwise, the method 500 moves to 514.

At 508, the method 500 may include comparing the signed hardware ID in the request with the signed hardware IDs of previous requests for the user as identified by the user ID to in order to determine a number of computing machines on which the user has played the game.

At 510, the method 500 may include determining whether the number of computing machines on which the user has played the game is greater than a computing machine threshold. If the number of computing machines on which the user has played the game is less than the computing machine threshold, then the method 500 moves to 512. Otherwise, the method 500 moves to 514.

At 512, the method 500 may include determining that the request is valid according to the plurality of security checks including determining that the signed hardware ID or the signed user ID matches the hardware ID or the user ID included in the signed receipt.

At 514, the method 500 may include determining that the request is invalid because one or more of the security checks failed.

By performing server-side security analysis on the information in the obfuscate-encoded bundle, protection may be afforded against unauthorized use of the game beyond a purchase or license agreement of the user.

Figure 6:
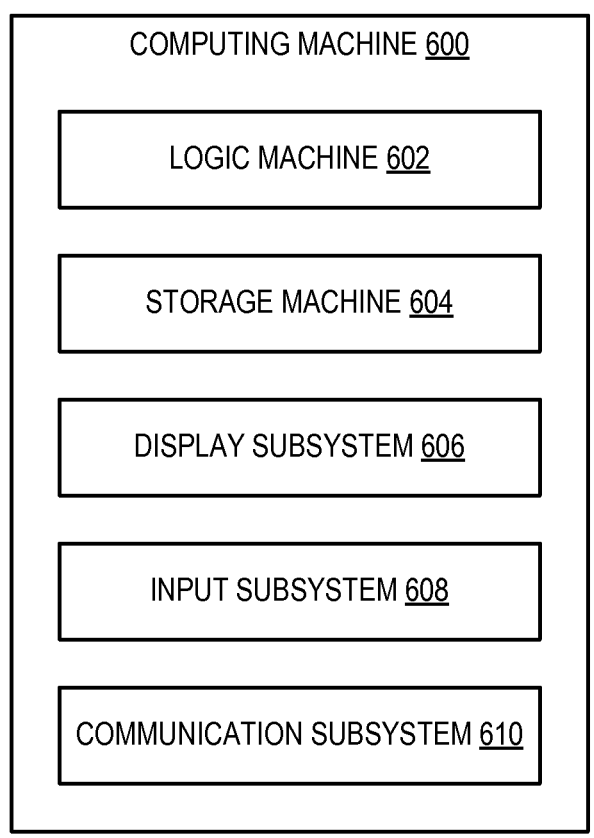
FIG. 6 schematically shows a computing system in accordance with an embodiment of the present disclosure.

FIG. 6 schematically shows a non-limiting embodiment of a computing system 600 that can enact one or more of the methods and processes described above. For example, computing system 600 may be representative of the client computing machine 102, the marketplace service computing machine 104, the account service computing machine 116, or the validation service computing machine 112 shown in FIG. 1. Computing system 600 is shown in simplified form. Computing system 600 may take the form of one or more personal computers, server computers, tablet computers, home-entertainment computers, network computing devices, gaming devices, mobile computing devices, mobile communication devices (e.g., smart phone), and/or other computing devices.

Computing system 600 includes a logic machine 602 and a storage machine 604. Computing system 600 may optionally include a display subsystem 606, input subsystem 608, communication subsystem 610, and/or other components not shown in FIG. 6.

Logic machine 602 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 604 includes one or more physical devices configured to hold instructions executable by the logic machine to implement the methods and processes described herein. When such methods and processes are implemented, the state of storage machine 604 may be transformed—e.g., to hold different data.

Storage machine 604 may include removable and/or built-in devices. Storage machine 604 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 604 may include volatile, nonvolatile, dynamic, static, read/write, read-only, random-access, sequential-access, location-addressable, file-addressable, and/or content-addressable devices.

It will be appreciated that storage machine 604 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 602 and storage machine 604 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

It will be appreciated that a "service", as used herein, may be one or more application programs executable across multiple user sessions. A service may be available to one or more system components, programs, and/or other services. In some implementations, a service may run on one or more server-computing devices.

When included, display subsystem 606 may be used to present a visual representation of data held by storage machine 604. This visual representation may take the form of a graphical user interface (GUI). As the herein described methods and processes change the data held by the storage machine, and thus transform the state of the storage machine, the state of display subsystem 606 may likewise be transformed to visually represent changes in the underlying data. Display subsystem 606 may include one or more display devices utilizing virtually any type of technology. Such display devices may be combined with logic machine 602 and/or storage machine 604 in a shared enclosure, or such display devices may be peripheral display devices.

When included, input subsystem 608 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 610 may be configured to communicatively couple computing system 600 with one or more other computing devices. Communication subsystem 610 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 600 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method for validating a user's entitlement to play a game, the method comprising:
   at a validation service, receiving a request for the user to play the game, wherein the request to play the game includes an obfuscate-encoded bundle including a signed user ID identifying the user, a signed hardware ID of a computing machine on which the game is requested to be played, and a signed receipt;
   decoding the obfuscate-encoded bundle;
   determining whether the request to play the game is valid according to a plurality of security checks including determining that one or both of the signed hardware ID and the signed user ID respectively match a hardware ID and/or a user ID included in the signed receipt; and
   if the request to play the game is valid, sending an authentication token to the computing machine that allows the user to play the game on the computing machine.

2. The method of claim 1, further comprising:
   if the request to play the game is invalid, preventing the user from playing the game on the computing machine.

3. The method of claim 1, further comprising:
   for every qualifying game action of the game, receiving a request to perform the game action, wherein the request to perform the game action includes the obfuscate-encoded bundle;
   determining whether the request to perform the game action is valid according to the plurality of security checks including determining that the signed hardware ID or the signed user ID matches the hardware ID or the user ID included in the signed receipt; and
   if the request to perform the game action is valid, allowing the game action to be performed.

4. The method of claim 3, wherein the game action includes at least one of granting to the user an achievement for the game, updating a leader board of the game, or storing a game statistic of the user.

5. The method of claim 1, wherein the plurality of security checks includes comparing the signed hardware ID in the request to play the game with signed hardware IDs of previous requests for the user to play the game in order to determine a number of computing machines on which the user has played the game, if the number of computing machines on which the user has played the game is greater than a computing machine threshold, determining that the request is invalid, and if the request is invalid, preventing the user from playing the game on the computing machine.

6. The method of claim 1, wherein the plurality of security checks includes one or more of determining that digital signatures of the signed user ID, the signed hardware ID and the signed receipt are valid, determining that a receipt issue time of the signed receipt is within a validity interval, and determining that a title ID of the game included in the signed receipt matches a title ID of the game included in the obfuscate-encoded bundle.

7. The method of claim 1, wherein a digital signature of the signed hardware ID, a digital signature of the signed user ID, and a digital signature of the signed receipt are signed by services included in a same computing platform.

8. The method of claim 1, wherein the signed hardware ID includes a component name and an ID for each of a plurality of components of the computing machine.

9. The method of claim 1, wherein the computing machine executes a sandbox environment type operating system without direct hardware access and without administrator level access.

10. A method for validating a user's entitlement to play a game, the method comprising:
   at a validation service for every qualifying game action of the game, receiving a request to perform the game action, wherein the request to perform the game action includes an obfuscate-encoded bundle including a signed user ID identifying the user, a signed hardware ID of a computing machine on which the game action is requested to be performed, and a signed receipt;
   decoding the obfuscate-encoded bundle;
   determining whether the request to perform the game action is valid according to a plurality of security checks including determining that the signed hardware ID and the signed user ID respectively match a hardware ID and a user ID included in the signed receipt; and
   if the request to perform the game action is valid, allowing the game action to be performed on the computing machine.

11. The method of claim 10, further comprising:
   if the request to perform the game action is invalid, preventing the game action from being performed on the computing machine.

12. The method of claim 10, further comprising:
   if the request to perform the game action is valid, sending an authentication token to the computing machine that allows the user to play the game on the computing machine.

13. The method of claim 10, wherein the game action includes at least one of launching the game, granting to the user an achievement for the game, updating a leader board of the game, or storing a game statistic of the user.

14. The method of claim 10, wherein the plurality of security checks includes one or more of determining that digital signatures of the signed user ID, the signed hardware ID and the signed receipt are valid, determining that a receipt issue time of the signed receipt is within a validity interval, and determining that a title ID of the game included in the signed receipt matches a title ID of the game included in the obfuscate-encoded bundle.

15. The method of claim 10, wherein a digital signature of the signed hardware ID, a digital signature of the signed user ID, and a digital signature of the signed receipt are signed by services included in a same computing platform.

16. The method of claim 10, wherein the signed hardware ID includes a component name and an ID for each of a plurality of components of the computing machine.

17. The method of claim 10, wherein the computing machine executes a sandbox environment type operating system without direct hardware access and without administrator level access.

18. A method for validating a user's entitlement to play a game, the method comprising:
   at a validation service, receiving a request including an obfuscate-encoded bundle including a signed user ID identifying the user, a signed hardware ID of a computing machine from which the request is sent, and a signed receipt;
   decoding the obfuscate-encoded bundle;
   comparing the signed hardware ID in the request with signed hardware IDs of previous requests for the user as identified by the user ID in order to determine a number of computing machines on which the user has played the game; and
   if the number of computing machines on which the user has played the game is greater than a computing machine threshold, preventing the user from playing the game on the computing machine.

19. The method of claim 18, further comprising:
   if the number of computing machines on which the user has played the game is not greater than the computing machine threshold, allowing the user to play the game on the computing machine.

20. The method of claim 18, wherein the signed hardware ID includes a component name and an ID for each of a plurality of components of the computing machine.

* * * * *